US 9,954,655 B2

(12) United States Patent
Megard et al.

(10) Patent No.: US 9,954,655 B2
(45) Date of Patent: Apr. 24, 2018

(54) STREAMED RADIO COMMUNICATION WITH ARQ AND SELECTIVE RETRANSMISSION OF PACKETS IN BURSTS

(75) Inventors: Kenneth Megard, Trondheim (NO); Ole Saether, Trondheim (NO); Ola Marvik, Trondheim (NO); Frank Berntsen, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 224 days.

(21) Appl. No.: 14/124,246
(22) PCT Filed: Jun. 6, 2012
(86) PCT No.: PCT/GB2012/051264
§ 371 (c)(1),
(2), (4) Date: Feb. 21, 2014
(87) PCT Pub. No.: WO2012/168701
PCT Pub. Date: Dec. 13, 2012

(65) Prior Publication Data
US 2015/0295682 A1 Oct. 15, 2015

(30) Foreign Application Priority Data
Jun. 7, 2011 (GB) .................................. 1109519.7

(51) Int. Cl.
H04L 1/16 (2006.01)
H04L 1/18 (2006.01)
(52) U.S. Cl.
CPC .......... H04L 1/1887 (2013.01); H04L 1/1614 (2013.01); H04L 1/1628 (2013.01); H04L 1/1858 (2013.01)
(58) Field of Classification Search
CPC ... H04L 1/1887; H04L 1/1628; H04L 1/1858; H04L 1/1614
See application file for complete search history.

(56) References Cited

U.S. PATENT DOCUMENTS 5,684,791 A * 11/1997 Raychaudhuri et al. .. 370/310.2
6,574,668 B1 * 6/2003 Gubbi et al. .................. 709/237
2008/0112350 A1 5/2008 Nanda et al.
2009/0327828 A1 * 12/2009 Ojala .................... H04L 1/1887
714/749
2010/0246490 A1 * 9/2010 Lavi .......................... H04L 1/18
370/328

FOREIGN PATENT DOCUMENTS

EP 1601127 A2 11/2005
JP H09-284261 10/1997
(Continued)

OTHER PUBLICATIONS

Transmittal Form (PCT/IB/326) and International Preliminary Report on Patentability (Form PCT/IB/373 & PCT/ISA/237) for PCT/GB2012/051264 dated Dec. 10, 2013.
(Continued)

Primary Examiner — Andrew Lai
Assistant Examiner — M Mostazir Rahman
(74) Attorney, Agent, or Firm — Koppel, Patrick, Heybl & Philpott

(57) ABSTRACT

A system for streaming data packets, comprises a source device (2) having a radio transceiver (10), and a receiving device (4) having a radio transceiver (14). The source device (2) is configured to receive or generate a stream of data packets at a stream rate and to transmit, by radio, a succession of data frames, each data frame comprising a successive set of one or more data packets (22a) from the stream that have not previously been transmitted. The receiving device (4) is configured to receive a data frame and to determine whether the one or more data packets (22a) in the data frame have been correctly or incorrectly received and to transmit by radio an acknowledgement message (22c) indicating that one or more of the data packets (22a) has been correctly received and/or is configured to transmit by radio an acknowledgement message indicating that one or more of the data packets has been incorrectly received. The source device (2) is also configured such that, if the source device (2) determines that a data packet (22a) has not been correctly received by the receiving device, the source device retransmits the data packet (24b) in a subsequent data frame along with one or more data packets (24a) from the stream that have not previously been transmitted. The source device (2) is further configured such that, if the source device does not (Continued)

Figure 1:
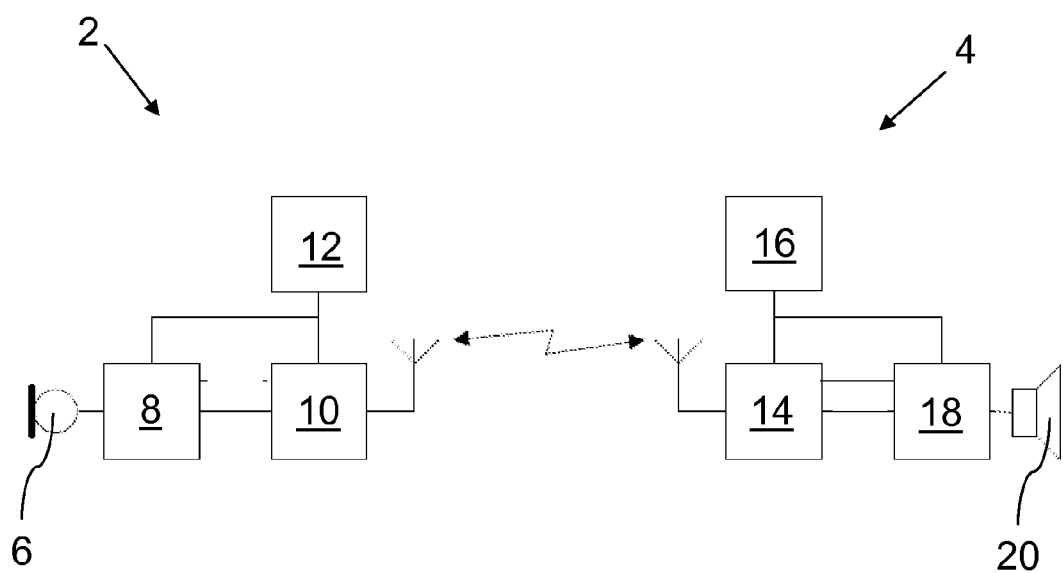

receive an acknowledgement message (24*c*) within an acknowledgement period after transmitting a data frame, the source device (2) retransmits the one or more data packets (26*b*) from the data frame in one or more subsequent data frames along with respective one or more data packets (26*a*) from the stream that have not previously been transmitted.

31 Claims, 1 Drawing Sheet

(56) References Cited

FOREIGN PATENT DOCUMENTS

| | | |
|---|---|---|
| JP | 2005-136545 | 5/2005 |
| JP | 2009-021781 | 1/2009 |
| JP | 2009-545204 | 12/2009 |
| WO | WO 01/56219 A1 | 8/2001 |
| WO | 2008051181 A1 | 5/2008 |

OTHER PUBLICATIONS

International Search Report (PCT/ISA/210) for PCT/GB2012/051264 dated Sep. 13, 2012.
Notice of Reasons for Refusal, Patent application No. 2014-514147, dated Jun. 28, 2016.

* cited by examiner

STREAMED RADIO COMMUNICATION WITH ARQ AND SELECTIVE RETRANSMISSION OF PACKETS IN BURSTS

This invention relates to the communication of a stream of data packets by radio.

It is sometimes necessary to stream short-lived data packets reliably by radio from a transmitter to a receiver.

For example, a wireless microphone may be connected by a digital radio link to a public-address system. The audio data from the microphone must be received, decoded and amplified with minimal latency in order to provide an acceptable user experience. Another example is streaming audio data by radio link to a wireless subwoofer in a home cinema system, where the signal from the subwoofer must be synchronised with the audio signals from the other (possibly wired) loudspeakers. A further example is a television camera streaming audio-visual data by radio link to a processing centre in a live broadcasting situation.

In all these examples, only very minimal buffering of the received data can be tolerated (e.g. of the order of a few milliseconds or tens of milliseconds; for example, about 25 ms).

Digital radio links can be subject to interference from other nearby radio transmitters and environmental noise, resulting in corruption or loss of one of more data packets in transmission. This can result in information being missing at the receiver, leading to imperfect output. In an audio situation, a receiver codec may have to introduce a period of silence when faced with missing data.

When streaming data over a digital radio link, it is known for the receiver to buffer received packets and to request retransmission of any packets that have been corrupted due to interference. Provided that there is sufficient spare capacity on the radio link, the audio transmitter will retransmit the indicated packets.

This mechanism, however, is still susceptible to buffer underflow at the receiver when interference is significant or prolonged. The present invention sets out to provide a more reliable approach.

From one aspect, the invention provides a system for streaming data packets, comprising a source device having a radio transceiver, and a receiving device having a radio transceiver, wherein:
  the source device is configured to receive or generate a stream of data packets at a stream rate;
  the source device is configured to transmit, by radio, a succession of data frames, each data frame comprising a successive set of one or more data packets from the stream that have not previously been transmitted;
  the receiving device is configured to receive a data frame and to determine whether the one or more data packets in the data frame have been correctly or incorrectly received;
  the receiving device is configured to transmit by radio an acknowledgement message indicating that one or more of the data packets has been correctly received and/or is configured to transmit by radio an acknowledgement message indicating that one or more of the data packets has been incorrectly received;
  the source device is configured such that, if the source device determines that a data packet has not been correctly received by the receiving device, the source device retransmits the data packet in a subsequent data frame along with one or more data packets from the stream that have not previously been transmitted; and
  the source device is configured such that, if the source device does not receive an acknowledgement message within an acknowledgement period after transmitting a data frame, the source device retransmits the one or more data packets from the data frame in one or more subsequent data frames along with respective one or more data packets from the stream that have not previously been transmitted.

From another aspect the invention provides a method of communicating data packets from a source device having a radio transceiver to a receiving device having a radio transceiver, the method comprising:
  the source device receiving or generating a stream of data packets at a stream rate;
  the source device transmitting, by radio, a succession of data frames, each data frame comprising a successive set of one or more data packets from the stream that have not previously been transmitted;
  the receiving device receiving a data frame and determining whether the one or more data packets in the data frame have been correctly or incorrectly received; and
  the receiving device transmitting by radio an acknowledgement message indicating that one or more of the data packets has been correctly received and/or transmitting by radio an acknowledgement message indicating that one or more of the data packets has been incorrectly received,
  wherein, if the source device determines that a data packet has not been correctly received by the receiving device, the source device retransmits the data packet in a subsequent data frame along with one or more data packets from the stream that have not previously been transmitted; and
  wherein, if the source device does not receive an acknowledgement message within an acknowledgement period after transmitting a data frame, the source device retransmits the one or more data packets from the data frame in one or more subsequent data frames along with respective one or more data packets from the stream that have not previously been transmitted.

The invention also extends to a source device having a radio transmitter and being configured:
  to receive or generate a stream of data packets at a stream rate;
  to transmit, by radio, a succession of data frames, each data frame comprising a successive set of one or more data packets from the stream that have not previously been transmitted;
  to determine if a data packet has not been correctly received by a receiving device, and in response to retransmit the data packet in a subsequent data frame along with one or more data packets from the stream that have not previously been transmitted; and
  such that if the source device does not receive an acknowledgement message within an acknowledgement period after transmitting a data frame, the source device retransmits the one or more data packets from the data frame in one or more subsequent data frames along with respective one or more data packets from the stream that have not previously been transmitted.

The invention further extends to a receiving device having a radio transmitter wherein:
  the receiving device is configured to receive a data frame by radio, the data frame comprising one or more data packets that have not previously been transmitted from a stream of data packets, and to determine whether the one or more data packets in the data frame have been correctly or incorrectly received;

the receiving device is configured to transmit by radio an acknowledgement message indicating that one or more of the data packets has been correctly received and/or is configured to transmit by radio an acknowledgement message indicating that one or more of the data packets has been incorrectly received;

the receiving device is configured to receive a retransmitted data packet in a subsequent data frame along with one or more data packets from the stream that have not previously been transmitted; and the receiving device is configured to output the stream of received data packets.

Thus it will be seen by those skilled in the art that, in accordance with the invention, the receiving device can request retransmission of corrupted data packets, but if an acknowledgement message fails to reach the source device, the source device will nonetheless still retransmit all the affected data packets. This contrasts with certain previous approaches, in which the corrupted data packets would never be retransmitted in such circumstances; for an audio streaming application, this could lead to undesirable artefacts in the audible output.

Each data packet preferably includes, or is accompanied by, an identifier, such as a number. The source device may label each data packet with a serial number, in the order in which they flow from the stream. The source device may comprise a counter, arranged to generate a sequence of serial numbers to be the identifiers. The serial numbers may loop after a maximum number; for example, the source device may use a 6-bit counter to generate serial numbers from 0 to 63 in a cycle. The maximum counter number is preferably at least as large as the latency of the system, expressed as a number of data packets at the stream rate.

The system latency can be regarded as the fixed or average delay between the source device transmitting the data packet stream, and the contents of the stream being output or otherwise processed by the receiving device. Ignoring transmission and reception delays, the system latency may be determined by the size of a buffer in the receiving device. Received data may be buffered before being output, or otherwise processed, as a received data stream. This latency value may be configurable, with a higher latency typically reducing the probability of errors in the received data stream, but with a higher delay from transmission to output, which may be undesirable in certain situations.

The receiving device may also comprise a counter. This counter may loop after the same maximum number as a counter in the source device. The two counters may be synchronised (e.g. both set to zero) during an initialisation process.

The receiving device may increment its counter for each received data frame. The source device preferably transmits a constant number of data packets newly taken from the front of the stream in each data frame. In this case, the receiving device may increment its counter by this constant number of data packets for each data frame it receives. It may do this even if some or all of the contents of the data frame are received incorrectly, e.g. corrupted due to interference. In this way, synchronisation can be maintained between the counters in the source device and receiving device, so long as a data frame is not lost entirely. If a data frame is lost entirely, a re-initialisation process may be required, unless the receiving device is also, or instead, arranged to increment its counter based on elapsed time, as is described below.

The data frames may be transmitted at irregular intervals, but are preferably transmitted periodically at a constant frame rate. This frame rate will typically be related to the stream rate by the number of data packets in each frame.

The data packets may be transmitted in any order within a data frame. In particular, the new data packets may come before or after the retransmitted data packets. A data packet may comprise any one or more of: header information; a source address; a destination address; a sequence number; a data payload; and a checksum. A data payload may comprise streaming data or command data or both. For example, it may comprise audio data or an instruction such as volume up/down, stop/play, mute etc.

The location and nature of any checksum, identifier, etc. within a data frame is not limited to any particular configuration. In some embodiments, such information could even be sent by a different channel, such as on an alternative radio frequency to the data packets themselves.

If a constant frame rate is used, the receiving device may be configured to increment its counter over time, in dependence on the frame rate, even if it does not receive a particular data frame. In this way, the receiving device may be able to maintain synchronisation with the source device's counter even if one or more data frames are entirely lost in transmission (e.g. if all the data packets in a frame are lost). Similarly, if the receiving device receives a data frame in which the identifiers are discontinuous with the identifiers in the last-received data frame, it may realign its counter with the new identifiers (inferring that a data frame has been lost entirely).

A data packet preferably comprises, or is accompanied by, information that the receiving device can use to detect correct or incorrect reception of the contents of the data packet. This may be a checksum or hash value.

The acknowledgement message may comprise information identifying one or more data packets that have been correctly received. Alternatively or additionally, it may comprise information identifying one or more packets that have been incorrectly received (e.g. corrupted due to interference).

The acknowledgement message may, for example, comprise a list of identifiers of data packets that have not been correctly received (or which have been correctly received). However, this is not very efficient as it can lead to potentially lengthy acknowledgement messages. In some preferred embodiments, therefore, the acknowledgement message comprises a set of flags (e.g. Boolean values) associated with respective data packets, wherein each flag indicates whether the corresponding data packet has been received correctly or not.

The set of flags may be communicated as a bit array within the acknowledgement message, e.g. with a "0" bit in a particular position indicating that the corresponding data packet has been received correctly, and a "1" bit indicating that it has not been received at all or has been received corrupted (or vice versa).

The acknowledgement messages may contain a common, constant number of such flags. In some preferred embodiments, this is the same as the number of unique identifiers applied to the data packets, e.g. the same as the number of unique values produced by the counter in the source device (for example, 64 flags for a 6-bit counter). Such an arrangement allows the receiving device to construct the acknowledgement message particularly efficiently, because each flag position can always correspond to a particular counter value (e.g. with the packet identifier zero taking the left-most position in the bit array, and the packet identifier 63 taking the right-most position in the bit array).

In other embodiments, however, the number of flags in the acknowledgement message may equal the fixed or maximum latency of the system, expressed as a number of data packets. This can result in a shorter acknowledgement message, if the latency is less than the number of unique identifiers, but it may require greater processing effort for the receiving device to construct the acknowledgement message. For example, the right-most position in a bit array may correspond to the newest data packet in the most recently-transmitted data frame, while the left-most position may correspond to the oldest data packet within the historic latency period; however, the packet identifiers will not have a fixed association with any particular position in the bit array, unless the maximum counter value exactly equals the latency period (expressed as a number of packets).

The receiving device may maintain a master set of flags, e.g. in RAM or in a register, which it updates after each data frame is received. Each acknowledgement message may then contain a copy of some or all of this master set of flags.

The source device preferably also maintains a set of flags, e.g. in RAM or in a register, which it updates after each acknowledgement message is received, so as to correspond to the flag values in the acknowledgement message.

When transmitting a data frame containing one or more data packets, the source device may update its set of flags in respect of the transmitted data packets, to indicate that the data packets have not (yet) been received correctly. It may do this every time it transmits a data frame, either before or after sending the data frame, or it may do it only if it does not receive an acknowledgement message for the data frame within the acknowledgement period.

In this way, the data packets will be marked for retransmission if a corresponding acknowledgement message fails to reach the source device correctly, as well as if the source device receives an acknowledgement message indicating that one or more data packets failed to arrive correctly.

As well as indicating that one or more of the data packets has been correctly or incorrectly received, an acknowledgement message may comprise any one or more of: header information; a source address; a destination address; a sequence number; a data payload; and a checksum. A data payload may comprise command data, e.g. instruction such as volume up/down, stop/play, mute etc. It might even comprise streamed data, such as audio data.

The acknowledgement period may have a constant duration, which may be timed by the source device. It may be shorter or longer than a frame duration. However it is preferably determined by the end of the data frame; e.g. ending at, or shortly before, the time when the source device starts assembling or transmitting the next data frame. This is preferred in embodiments in which the radio transceivers communicate in half-duplex.

On receiving an acknowledgement message, the source device determines which, if any, data packets should be retransmitted.

Each data frame may have space for only a limited number of retransmitted data packets (i.e. data packets in addition to those newly taken from the front of the stream). This retransmission capacity may be less than the latency of the system, meaning that it may be necessary, in cases of substantial interference, to divide the retransmitted packets between more than one data frame.

In some preferred embodiments, priority for retransmission is given to the oldest data packet to be retransmitted, so long as it is still within the latency (buffer) period, with the newest data packet flagged for retransmission being given the lowest priority. The source device may place data packets into the data frame in descending order of priority, until the retransmission capacity for that data frame is reached.

A data packet may be corrupted during retransmission, and the system may therefore retransmit the same data packet more than once (within the latency lifetime of the packet).

If the source device maintains a set of flags, as described previously, then when assembling a data frame it preferably determines which of the k most recently-transmitted data packets are flagged for retransmission, where k is the latency of the system (expressed as a number of data packets). The source device then includes the oldest m of these data packets in the data frame, where m is the retransmission capacity of the data frame.

By ignoring flags relating to data packets older than the latency period, channel capacity is not wasted in retransmitting data packets that have expired.

Prioritising retransmission in this way is believed to give particularly beneficial performance in avoiding buffer under-run at the receiving device.

Data frames may have different retransmission capacities, but typically every data frame will have the same retransmission capacity (e.g. capacity for 14 retransmitted data packets, plus 4 new data packets from the front of the stream).

The data packets may contain any type of information, but in some embodiments they comprise audio or video data. The source device may receive a stream of data and convert this into the stream of data packets. The receiving device may combine the received data packets (e.g. reading them out of a buffer) and output a stream of data. The output data stream should be the same as the data stream received by the source device, unless such substantial interference has occurred that a buffer under-run has been unavoidable.

The source device is preferably an integrated circuit, e.g. a radio-on-a-chip. It may have an integrated or external antenna. Similarly the receiving device is preferably an integrated circuit, e.g. a radio-on-a-chip, and may have an integrated or external antenna.

Figure 2:
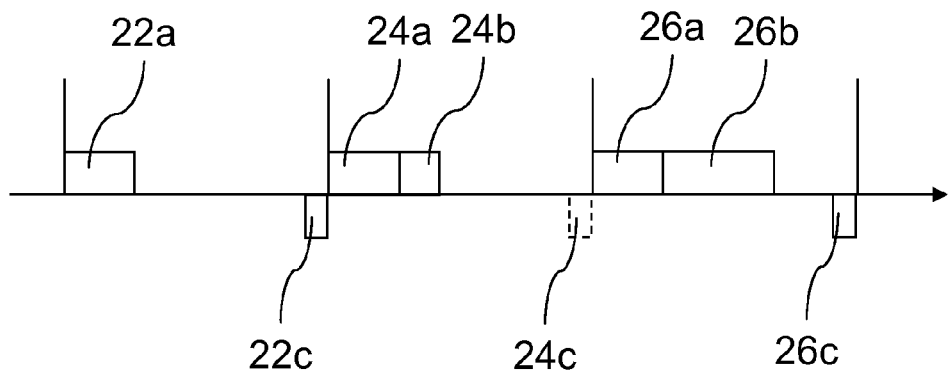

Certain preferred embodiments of the invention will now be described, by way of example only, with reference to the accompanying drawings, in which:

FIG. 1 is a schematic view of a radio communication system embodying the invention; and FIG. 2 is timing diagram for an exemplary data exchange.

FIG. 1 shows a wireless microphone device 2 which is linked by radio to a remote public address system 4. The wireless microphone device 2 comprises a microphone element 6 which is connected to an analogue-to-digital converter (ADC) 8. The digital output of the ADC 8 feeds into a radio audio transmitter chip (ATX) 10. The ADC 8 and ATX 10 are controlled by a microcontroller (MCU) 12, which is also housed within the wireless microphone device 2.

The public address system 4 comprises a radio audio receiver chip (ARX) 14, an output of which is connected to a digital-to-analogue converter (DAC) 18. The ARX 14 and DAC 18 are controlled by a microcontroller (MCU) 16. The analogue output of the DAC 18 is connected to a loudspeaker 20 in the public address system 4.

Additional components such as amplifiers, filters, power supplies, etc. are not shown for the sake of clarity, but are arranged and operate in a conventional manner.

In use, audible sound is received continuously by the microphone 6. This signal is digitised by the ADC 8 and sent as a data stream to the ATX 10. The ATX 10 divides the data stream into a stream of discrete data packets, which it transmits by radio. Details of the data transmission protocol are given below.

Once the data packets are received by the ARX 14 in the public address system 4, they are assembled in the correct order and the data within the packets are extracted to form a data stream mirroring the original stream produced by the ADC 8 in the wireless microphone device 2. In situations of extreme interference, the data stream could become corrupted, but the data exchange protocol is designed such that this should happen rarely. The data stream is passed through the DAC 18 to give a continuous analogue output which is amplified and played through the loudspeaker 20.

FIG. 2 shows three successive data frames along a time line, with time flowing from left to right. Rectangles above the line represent data transmitted by the ATX 10, while rectangles below the line represent data transmitted by the ARX 14. The diagram is not to scale.

A conventional radio initialisation procedure is used to establish a time-locked radio link between the ATX 10 and the ARX 14, at a particular data frame rate (or burst rate). For example, data frames of length 3 ms may be sent at 333 Hz.

The ATX 10 and ARX 14 both have internal counters, which are synchronised to zero at initialisation. Both counters roll over to zero after reaching a maximum value, e.g. 111111 binary (sixty-three).

A user-configurable register in the ARX 14 determines the latency period for the data flow; i.e. how many data packets are buffered in the ARX 14 before being output to the DAC 18. The latency in this example is nine data frames, but it could be seven or any other suitable value. This value will be shared with the ATX 10, which uses it to determine when data packets are too old to retransmit.

Under normal, interference-free operation, the ATX 10 transmits four data packets 22a in each data frame. These data packets contain the most recently-output data from the ADC 8. As a minimum, each data packet contains: an audio data payload, a checksum, and a data-packet serial number generated by the packet-counter in the ATX 10.

When it transmits the four data packets, the ATX 10 sets a respective flag for each packet, in a register or in memory, indicating that it has not yet received an acknowledgement of safe receipt for each those data packets from the ARX 14. The data packets are thereby effectively marked for retransmission by default, as is explained in more detail below.

The ARX 14 receives the data transmission which should contain the four data packets 22a. It checks the checksum for each data packet, and uses the packet's serial number or its internal counter (e.g. if the serial number was corrupted) to set a bit flag to show whether each of the four data packets it should have received has been correctly received. It increments its internal counter by four.

A set of sixty-four binary flags is maintained, corresponding to the last sixty-four data packets to have been transmitted. By having the same number of flags as unique counter values, each flag can conveniently be addressed by its corresponding data-packet serial number.

The received data packets are stored in a buffer memory in the ARX 14. If the same data packet is received correctly more than once, later copies may be discarded, or may overwrite earlier ones.

The ARX 14 then returns an acknowledgement message 22c to the ATX 10 at the end of the data frame. This message 22c contains, as a minimum, a copy of the sixty-four Boolean flags, e.g. in the form of a binary array, and a checksum.

Under normal operation, the ATX 10 receives the acknowledgement message 22c. Assuming the checksum is valid, it then updates a local set of sixty-four bit flags with the values contained in the acknowledgement message 22c.

If all the data packets 22a are correctly received, and the acknowledgement message 22c is correctly received, the process will then repeat, with the ATX 10 transmitting the next four data packets from the stream in the next data frame, and so on. The ARX 14 reads data out of the buffer memory at the same average data rate, and outputs it to the DAC 18.

If any of the data packets 22a is not received correctly, the ARX 14 this will be flagged in the acknowledgement message 22c. In the next data frame, the ATX 10 then sends the next four data packets 24a from the front of the incoming stream, but, in addition, retransmits any of the previous thirty-six data packets 24b indicated as not having been correctly received in its copy of the binary flags. Thirty-six packets is the length of the system latency (nine data frames each with four data packets).

The data frame may only have a capacity of, say, eighteen data packets in total, meaning that there is space to retransmit up to fourteen data packets as well as the four new data packets 24a. If more than fourteen data packets are flagged for retransmission, the oldest fourteen of the last thirty-six packets are transmitted in the data frame.

On receiving a retransmitted data packet, the ARX 14 checks its checksum and, if correctly received, sets the corresponding binary flag to show this. It uses the packet's serial number to insert the packet (or its data payload) into the buffer memory in the appropriate position.

The present system behaves particularly well in the situation where an acknowledgement message 24c is not received correctly by the ATX 10, e.g. because interference corrupted the message. If the ATX 10 receives no acknowledgement message 24c for a particular data frame within a timeout period, e.g. before assembly of the next data frame starts, or if it receives only a corrupted acknowledgement message (e.g. with an invalid checksum), the set of binary flags in the ATX 10 are not changed.

The set of flags in the ATX 10 will therefore reflect the values of the flags from the last acknowledgement message 22c which was successfully received, for all data packets sent prior to that last successful acknowledgement message 22c, with the flags for all the data packets sent since that last message 22c indicating that no confirmation of receipt has yet arrived for those data packets (i.e. they are marked for retransmission). In the next data frame, the ATX 10 will therefore transmit the oldest data packets marked for retransmission 26b, in addition to four new data packets 26a from the front of the stream. Unless the capacity of the data frame is reached, the retransmitted data packets 26b will consist of the "new" and retransmitted data packets 24a, 24b from the previous data frame.

In an extreme situation, where nine successive acknowledgement messages are lost, the ATX 10 will have to stop retransmitting the oldest data packets, as they will fall off the end of the thirty-six-packet-wide sliding window which moves round the sixty-four binary flags. However, this does not necessarily mean that a buffer underflow will occur at the ARX 14. Because every data frame includes four new data packets, at the stream rate, it is possible that the data packets do all arrive despite the acknowledgement messages being lost.

An outline of this algorithm in pseudo-code follows below, in which

NPF=number of new packets per frame (e.g. four);

PID2=packet ID for front packet of the stream. When starting streaming, PID2 is equalised in ATX and ARX, and since ATX and ARX are time locked during streaming, PID2 will be incremented identically in ATX and ARX. PID2 can be implemented using a practicable number of bits (e.g. 6 bits);

ACK=array containing one entry per packet ID, showing if the packet is successfully received (or not) by ARX (e.g. a 64-bit array);

TD=predefined transmission delay for the link, unit is packets (e.g. thirty-six);

mps=maximum number of packets which can be transmitted during a frame (e.g. eighteen);

PID1=oldest packet (PID1=PID2−TD); and nps=number of packets in the current frame.

A frame consists of: ATX transmit/ARX receive—pause—ARX transmit/ATX receive—pause.

For ease of understanding, the rolling of the n-bit packet ID counter past zero has been ignored. In practice, modulo arithmetic is required, as would be well understood by one skilled in the art.

```
// ATX transmit process, concurrent with ARX receive process
begin
    PID2=PID2+NPF
    PID1=PID2−TD
    nps=0
    for i=PID1,i≤PID2,i=i+1 {
        if (nps ≤ mps) {
            if (ACK[i]=1) transmit packet(i)
            nps=nps+1
        } else exit // no time for more packets in this frame
    }
end
// ATX receive process, concurrent with ARX transmit process
begin
    if (ACK-packet successfully received)
        ACK[PID1:PID2+NPF]="as received from ARX"
    else    {
        ACK[PID1:PID2−NPF]=ACK[PID1:PID2−NPF]
        // unchanged
        ACK[PID2−NPF+1:PID2]=1    // assume lost; retransmit
        ACK[PID2+1:PID2+NPF]=1    // send next frame
    }
end
// ARX receive process, concurrent with ATX transmit process
begin
    PID2=PID2+NPF
    PID1=PID2−TD
    for i=PID1,i≤PID2,i=i+1 {
        if (packet[i] successfully received) ACK[i]=0
        else   ACK[i]=1    // mark for retransmission
    }
end
// ARX transmit process, concurrent with ATX receive process
begin
    ACK[PID2:PID2+NPF]=1     // request next frame
    send ACK[PID1:PID2+NPF]
end
```

Thus it will be seen that a streaming radio communication system has been described which is robust against the effects of interference on data travelling in both directions.

The invention claimed is:

1. A system for streaming a plurality of data packets, comprising a source device having a radio transceiver, and a receiving device having a radio transceiver, wherein:

the source device is configured to receive or generate a stream of the plurality of data packets at a stream rate;

the source device is configured to transmit, by radio, a succession of data frames, each data frame from the succession of data frames comprising a successive set of one or more data packets from the stream that have not previously been transmitted;

the receiving device is configured to receive a received data frame from the succession of data frames and to determine whether the one or more data packets in the received data frame have been correctly or incorrectly received;

the receiving device is configured to transmit by radio an acknowledgement message indicating that the one or more of the data packets in the received data frame has been correctly received and/or is configured to transmit by radio an acknowledgement message indicating that the one or more of the data packets in the received data frame has been incorrectly received;

the source device is configured such that, if the source device determines that an unreceived data packet in the received data frame has not been correctly received by the receiving device, the source device retransmits the unreceived data packet in a subsequent data frame along with the one or more data packets from the stream that have not previously been transmitted; and the source device is configured such that, if the source device does not receive the acknowledgement message confirming whether or not the one or more data packets in the received data frame were correctly received by the receiving device within an acknowledgement period after transmitting the received data frame from the succession of data frames, the source device retransmits the one or more data packets from the received data frame associated with the missing acknowledgement message in the one or more subsequent data frames along with the one or more data packets from the stream that have not previously been transmitted.

2. The system of claim 1, wherein each data packet from the plurality of data packets includes, or is accompanied by, an identifier.

3. The system of claim 1, wherein the source device is configured to label each data packet from the plurality of data packets with a serial number, in the order in which they flow from the stream.

4. The system of claim 2, wherein the source device comprises a counter arranged to generate a sequence of serial numbers to be identifiers.

5. The system of claim 4, wherein the receiving device also comprises a counter.

6. The system of claim 5, wherein the receiving device is configured to increment the counter for each received data frame from the succession of data frames.

7. The system of claim 6, wherein the source device is configured to transmit a constant number of data packets newly taken from the front of the stream in each data frame and wherein the receiving device is configured to increment the counter by the constant number of data packets for each data frame it receives.

8. The system of claim 1, wherein the source device is configured to transmit the succession of data frames periodically at a constant frame rate.

9. The system of claim 5, wherein the source device is configured to transmit the succession of data frames periodically at a constant frame rate and the receiving device is configured to increment the counter over time, in dependence on the constant frame rate, even if it does not receive a particular data frame.

10. The system of claim 1, wherein the acknowledgement message comprises a set of flags associated with the one or more data packets in the received data frame, wherein each flag from the set of flags indicates whether a corresponding one of the one or more data packets in the received data frame have been received correctly or not.

11. The system of claim 10, wherein the acknowledgement message contains a common, constant number of the set of flags which is the same as a number of unique identifiers applied to the one or more data packets in the received data frame.

12. The system of claim 10, wherein when transmitting a data frame from the succession of data frames containing the one or more data packets, the source device is configured to update the set of flags in respect of the one or more data packets in the data frame, to indicate that the one or more data packets have not been received correctly.

13. The system of claim 1, wherein the acknowledgement period has a constant duration determined by the end of the one or more subsequent data frames.

14. The system of claim 1, configured so that priority for retransmission is given to the oldest data packet from the one or more data packets to be retransmitted, so long as the oldest data packet is still within a predetermined latency period, with the newest data packet flagged for retransmission being given the lowest priority.

15. The system of claim 1, configured to determine which of a value, k most recently-transmitted data packets are flagged for retransmission, where k is a latency of the system expressed as a number of data packets.

16. A method of communicating a plurality of data packets from a source device having a radio transceiver to a receiving device having a radio transceiver, the method comprising:
the source device receiving or generating a stream of the plurality of data packets at a stream rate;
the source device transmitting, by radio, a succession of data frames, each data frame from the succession of data frames comprising a successive set of one or more data packets from the stream that have not previously been transmitted;
the receiving device receiving a received data frame from the succession of data frames and determining whether the one or more data packets in the received data frame have been correctly or incorrectly received; and
the receiving device transmitting by radio an acknowledgement message indicating that the one or more of the data packets has been correctly received and/or transmitting by radio an acknowledgement message indicating that the one or more of the data packets has been incorrectly received;
wherein, if the source device determines that an unregistered data packet from the one or more data packets in the received data frame has not been correctly received by the receiving device, the source device retransmits the unreceived data packet in a subsequent data frame along with the one or more data packets from the stream that have not previously been transmitted; and
wherein, if the source device does not receive the acknowledgement message confirming whether or not the one or more data packets in the received data frame were correctly received by the receiving device within an acknowledgement period after transmitting the received data frame from the succession of data frames, the source device retransmits the one or more data packets from the received data frame associated with the missing acknowledgement message in one or more subsequent data frames along with the one or more data packets from the stream that have not previously been transmitted.

17. The method of claim 16, wherein each data packet from the plurality of data packets includes, or is accompanied by, an identifier.

18. The method of claim 16, wherein the source device labels each data packet from the plurality of data packets with a serial number, in the order in which they flow from the stream.

19. The method of claim 17, wherein the source device comprises a counter which generates a sequence of serial numbers to be identifiers.

20. The method of claim 19, wherein the receiving device also comprises a counter.

21. The method of claim 20, wherein the receiving device increments the counter for each received data frame from the succession of data frames.

22. The method of claim 21, wherein the source device transmits a constant number of data packets newly taken from the front of the stream in each data frame and wherein the receiving device increments the counter by the constant number of data packets for each data frame it receives.

23. The method of claim 16, wherein the source device transmits the succession of data frames periodically at a constant frame rate.

24. The method of claim 20, wherein the source device transmits the succession of data frames periodically at a constant frame rate and the receiving device increments the counter over time, in dependence on the constant frame rate, even if it does not receive a particular data frame.

25. The method of claim 16, wherein the acknowledgement message comprises a set of flags associated with the one or more data packets in the received data frame, wherein each flag from the set of flags indicates whether a corresponding one of the one or more data packets in the received data frame have been received correctly or not.

26. The method of claim 25, wherein the acknowledgement message contains a common, constant number of the set of flags which is the same as a number of unique identifiers applied to the one or more data packets in the received data frame.

27. The method of claim 25, wherein when transmitting the succession of data frames containing the one or more data packets from the succession of data frames, the source device updates the set of flags in respect of the one or more data packets in the data frame, to indicate that the one or more data packets have not been received correctly.

28. The method of claim 16, wherein the acknowledgement period has a constant duration determined by the end of the one or more subsequent data frames.

29. The method of claim 16, wherein priority for retransmission is given to the oldest data packet from the one or more data packets to be retransmitted, so long as the oldest data packet is still within a predetermined latency period, with the newest data packet flagged for retransmission being given the lowest priority.

30. The method of claim 16, comprising determining which of a value, k most recently-transmitted data packets are flagged for retransmission, where k is a latency of the system expressed as a number of data packets.

31. A source device comprising:
a radio transmitter;
wherein the source device is configured:
to receive or generate a stream of a plurality of data packets at a stream rate;

to transmit, by radio, a succession of data frames, each data frame from the succession of data frames comprising a successive set of one or more data packets from the stream that have not previously been transmitted;

to determine if an unreceived data packet in a received data packet has not been correctly received by a receiving device, and in response, to retransmit the unreceived data packet in a subsequent data frame along with the one or more data packets from the stream that have not previously been transmitted; and such that if the source device does not receive an acknowledgement message confirming whether or not the one or more data packets in the received data frame were correctly received by the receiving device within an acknowledgement period after transmitting the received data frame from the succession of data frames, the source device retransmits the one or more data packets from the received data frame associated with the missing acknowledgement message in one or more subsequent data frames along with the one or more data packets from the stream that have not previously been transmitted.

\* \* \* \* \*